US010215601B2

(12) United States Patent
Kruusmaa et al.

(10) Patent No.: US 10,215,601 B2
(45) Date of Patent: Feb. 26, 2019

(54) DEVICE AND METHOD FOR MEASURING THE PARAMETERS OF FLUID FLOW

(71) Applicant: Tallinn University of Technology, Tallinn (EE)

(72) Inventors: Maarja Kruusmaa, Tallinn (EE); Asko Ristolainen, Tallinn (EE); Alar Kuusik, Tallinn (EE); Jeffrey Andrew Tuhtan, Tallinn (EE)

(73) Assignee: Tallinn University of Technology, Tallinn (EE)

( * ) Notice: Subject to any disclaimer, the term of this patent is extended or adjusted under 35 U.S.C. 154(b) by 0 days.

(21) Appl. No.: 15/648,020

(22) Filed: Jul. 12, 2017

(65) Prior Publication Data

US 2018/0023986 A1 Jan. 25, 2018

(51) Int. Cl.
*G01F 1/32* (2006.01)

(52) U.S. Cl.
CPC .................................. *G01F 1/3263* (2013.01)

(58) Field of Classification Search
CPC ............ G01F 1/3263; G01V 1/00; A63F 9/29
See application file for complete search history.

(56) References Cited

U.S. PATENT DOCUMENTS

| 4,124,841 | A | * | 11/1978 | Kettunen | G01V 1/181 200/61.45 R |
| 5,153,394 | A | * | 10/1992 | Abendroth | H01H 35/02 200/61.45 R |
| 5,252,796 | A | * | 10/1993 | Hedger | F42C 19/06 200/82 R |
| 5,625,348 | A | * | 4/1997 | Farnsworth | G01V 1/008 324/323 |
| 2011/0124413 | A1 | * | 5/2011 | Levanon | G06F 3/016 463/36 |

\* cited by examiner

*Primary Examiner* — Jewel V Dowtin
(74) *Attorney, Agent, or Firm* — Maine Cernota & Rardin

(57) ABSTRACT

Sensor device and method for determining the parameters of fluid flow with a sensor, including an oblong element, extending into fluid flow, fixed mechanically to the body of the sensor device with a flexible link in one end, and a mechanically connected vibration sensor and a data acquisition module connected electrically to the vibration sensor and positioned in the body, which is set to determine the frequency response curve of oscillation caused by liquid flow in the cylindrical element, and to derive the speed and type of fluid flow from the measured frequency response curve.

20 Claims, 7 Drawing Sheets

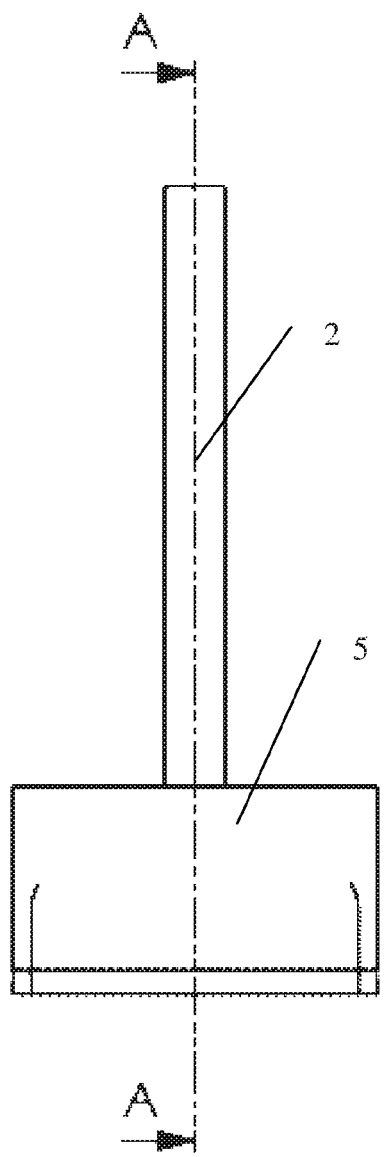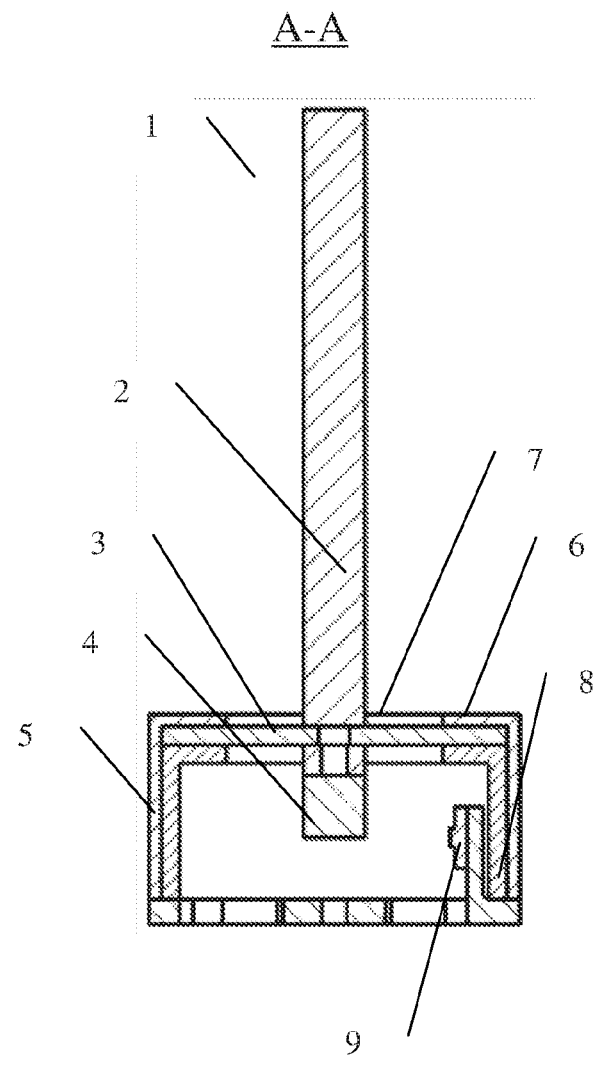
Fig 3
Fig 4

DEVICE AND METHOD FOR MEASURING THE PARAMETERS OF FLUID FLOW

RELATED APPLICATIONS

This application claims priority from Estonian patent application No P201600012, filed on Jul. 19, 2016, which is incorporated herein by reference in its entirety for all purposes.

FIELD OF THE INVENTION

The invention belongs to the field of fluid mechanics, namely to sensors suitable for and adapted for flow monitoring and measurements, including hydro- and aerotechnical sensors and monitoring and measuring methods, more specifically, to solutions used for determining the speed of fluid flow and other fluid flow-related parameters both in fluid bodies and pipes, and in water bodies and pipes in particular.

BACKGROUND OF THE INVENTION

Flow of water is more or less similar to the flow of other fluids, including fluids such as oil or blood, fine solid particles like dust or ashes, gases and even for multiphase flow (i.e., simultaneous flow of materials with different states or phases, i.e. gas, fluid or solid, or materials with different chemical properties but in the same state or phase, i.e., fluid-fluid systems such as oil droplets in water). In this patent application, the generic term "fluid" has also been used even when it is clear from the context that the fluid in question is in fact water.

Flow of fluid in rivers and at the coast can be described through speed, swirling, and pressure over a broad time-space scale. Therefore, it is not directly possible to determine changes in all physical parameters of fluid flow. Instead, attention is paid to the main parameters important from the hydrodynamic point of view, such as speed and direction flow near the bottom.

In the case of flow of fluid with a low speed, the flow is rather laminar, i.e. the substance particles of fluid have constant speed only in the direction of flow; the laminar flow of fluid can be viewed as a sliding of several thin layers of fluid on one another (see also FIG. 3). Turbulent flow is a flow of fluid where substance particles form swirls, while the mass of substance is moving in the direction of the flow (see also FIG. 4). At certain critical speed, friction starts to cause swirls and the flow becomes turbulent. Transition from a laminar to turbulent flow is characterised by the Reynolds number:

$$Re=UL/v<Recrt\sim500\text{-}2500, \text{ where}$$

Re—Reynolds number, U—characteristic flow speed, L—length scale of flow and v—kinematic viscosity.

Laminar flow almost never occurs in natural water bodies.

Flow speed is determined mainly for determining the flow rate of a fluid. Flow is mainly turbulent and measuring is based on the principles of turbulent flow. Flow speed fluctuates around the average value; to find the correct result, measurements must be performed during a certain period, e.g. 60-100 seconds. Generally, hydrometric rotors are used for measuring, but floats or electromagnetic measuring equipment are also utilised. At the same time, determination of flow speed and the nature of flow is necessary for controlling the objects moving in water; the flow of fluid can also be used as an energy source for watercrafts.

A known method is using a sensor based on pressure sensors inspired by the lateral line of fish for estimating flow speed in a limited range (0 to 0.5 m/s), where a sensor inspired by neuromast is tilted up to 90 degrees in the flow, compared to a state without the flow. In this solution, pressure sensors can be easily soiled and damaged upon contact with particles included in the flow of water.

US20140137664 describes a device with the float anchored in the seabed, including an accelerometer for measuring flow speed caused by waves, ocean currents, relative swell kinetics, etc. The device includes a float with a suspended accelerometer, which is anchored with a cable to the bed of a water body, whereby the accelerometer measures the tilting angle of the float. This solution requires a float and fixing device to the bed of a water body, which makes installation of the solution difficult.

New sensors with a simple design are required, sensors which are suitable for determining the speed of the flow of fluid and other parameters, such as the turbulence of flow and Reynolds number.

SUMMARY OF THE INVENTION

The device according to embodiments of the invention includes an oblong element, such as oblong cylindrical element, a rod or a rod with spherical head fixed mechanically to a base unit with a flexible link in one end, with a mechanically connected vibration sensor and a data acquisition module connected electrically to the vibration sensor, which is set to determine the frequency response curve of oscillation in the cylindrical element caused by fluid flow, and to derive flow parameters from the measured frequency response curve, e.g., but not limited to flow speed, direction of flow, type of flow, and Reynolds number.

In one such embodiment the vibration sensor is an acceleration sensor (accelerometer or G sensor).

According to the method of one embodiment of the invention, the parameters of fluid flow, including flow speed, direction of flow and type of flow (laminar or turbulent), are determined with the method of an object obstructing the flow, i.e. based on the frequency response curve of an oblong, cylindrical object fixed with a flexible link in one end, placed into the fluid, in the fluid flow. Preferably, flow speed is determined from the frequency spectrum of the response curve, preferably based on the average value of the amplitude of frequency spectrum in the area of resonance frequency of the system of the cylindrical object.

According to another embodiment of the method, the parameters of fluid flow are determined from the inclination of the oblong object fixed with a flexible link in one end in the fluid flow in relation to the gravitation vector, while the frequency response curve of oscillation of the oblong cylindrical object is used for determining the change of the character of flow from laminar to turbulent. Preferably, the change of the type of flow from laminar to turbulent is determined based on resonance frequency in the frequency spectrum of frequency response curve of oscillation.

According to a further embodiment method, the parameters of laminar flow of fluid are determined from the inclination of the oblong object caused in fluid flow in relation to the gravitation vector and the parameters of turbulent flow of fluid based on the frequency response curve of oscillation of the object.

In still another embodiment the inclination and oscillation of the cylindrical object is determined with one or more accelerometers connected with the object (G sensor). Preferably, the direction of fluid flow is determined through the difference of output signals of multidimensional accelerometers.

In yet another embodiment, the direction of gravitation vector is determined with additional reference micromechanical sensors with static positions not depending on the fluid flow, preferably with an additional accelerometer.

Embodiments of the invention can be installed on the bed of a fluid body, such as water body, the oblong object directed upwards. The device can be connected to technical constructions located in the fluid, the oblong object preferably directed upward or downward.

Vibration in the installation site of embodiments of the invention is compensated with the information of other micromechanical sensors installed in the device, e.g. accelerometers, which are not influenced by the flow of fluid.

Data collected according to the method are processed with a computer or microprocessor connected directly with the device, or are transmitted for processing into a central computer or cloud service.

Several embodiments of the invention can be arranged into groups to measure the parameters of fluid flow in several points and thus construct a vector of the parameters of fluid flow or a two or three-dimensional map. Upon installation, such grouped devices can be set to read and store data with specified intervals or based on any other regularity during a specified period. The devices are synchronised upon installation and removed after the expiration of a specified period for reading the data.

BRIEF DESCRIPTION OF THE DRAWINGS

FIG. 1 is a general view of the first embodiment of a device of the invention.

FIGS. 2 and 3 are lateral views of the first embodiment of the invention.

FIG. 4 is section A-A shown on FIG. 3.

DETAILED DESCRIPTION

Figures 1, 2:
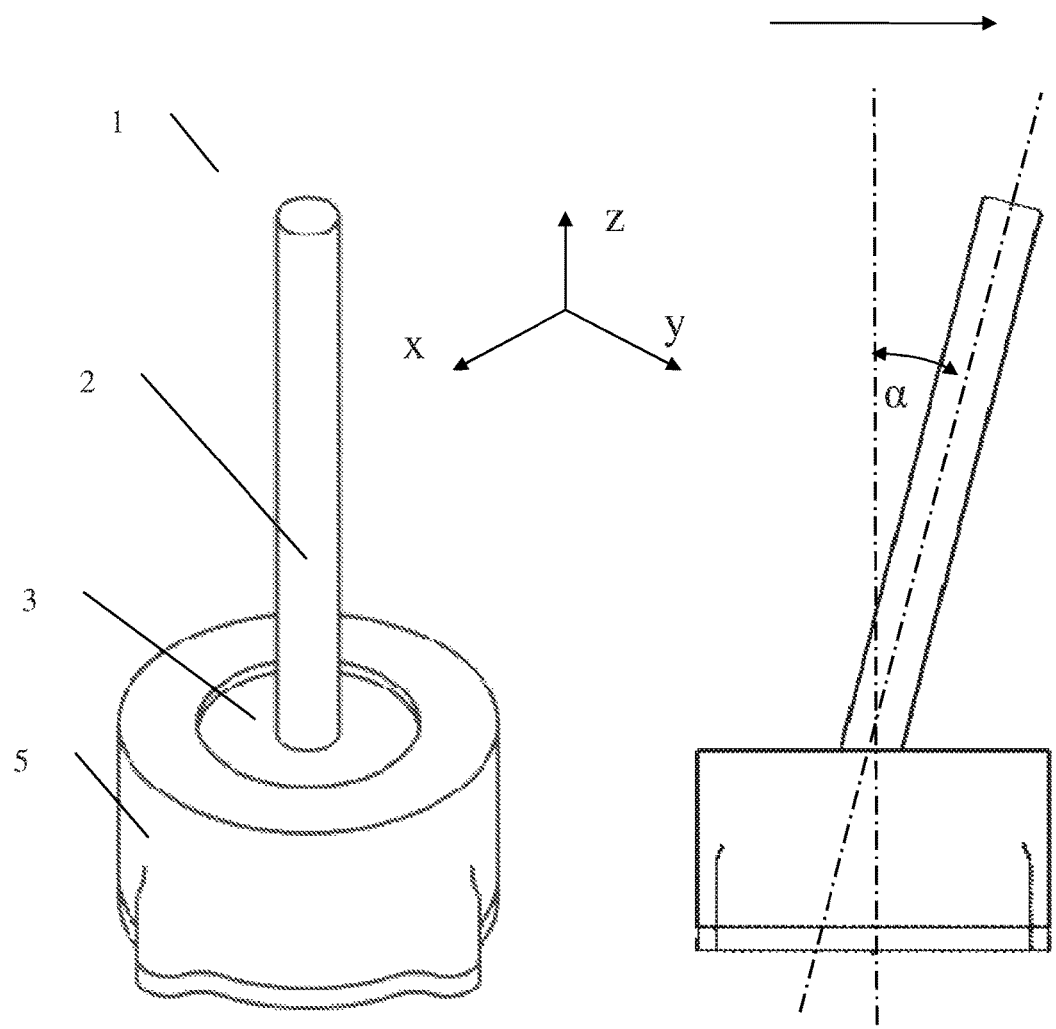
Figure 5:
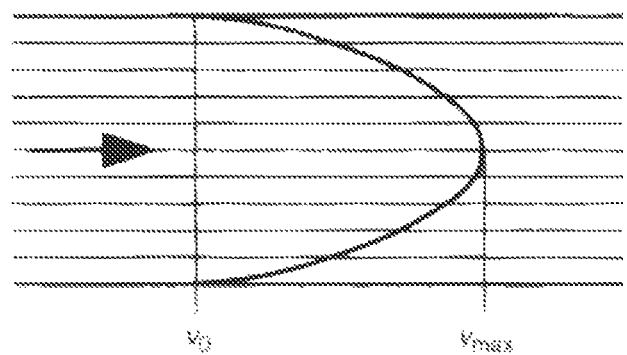
FIGS. 5 and 6 describe correspondingly laminar and turbulent fluid flow.
Figure 6:
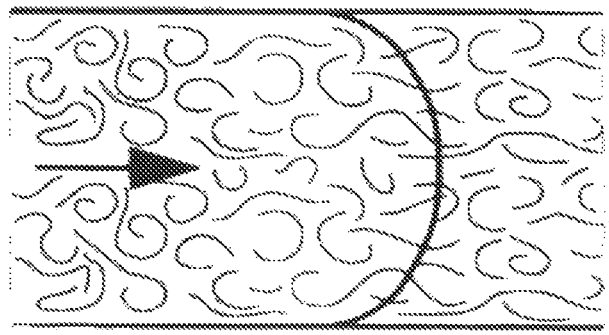
Figure 7:
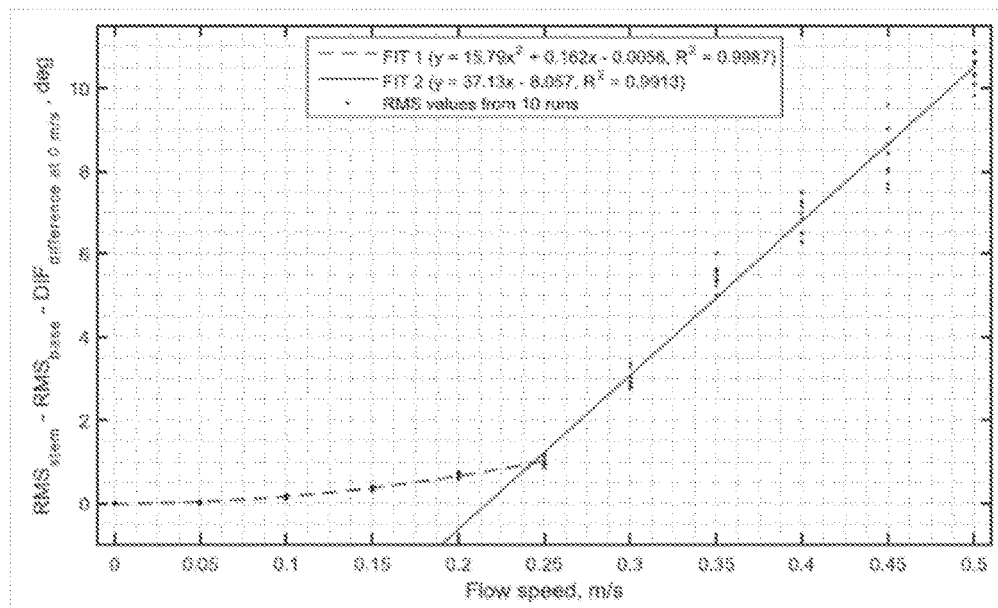
FIG. 7 illustrates the dependence of the root-mean-square value of the tilting angle towards the direction of flow of the plastic rod of an embodiment shown on FIG. 1 on the speed of fluid flow (where the effect of the tilting angle of the original position of the body and plastic rod has been eliminated) in the region of laminar as well as turbulent flow.
Figure 8:
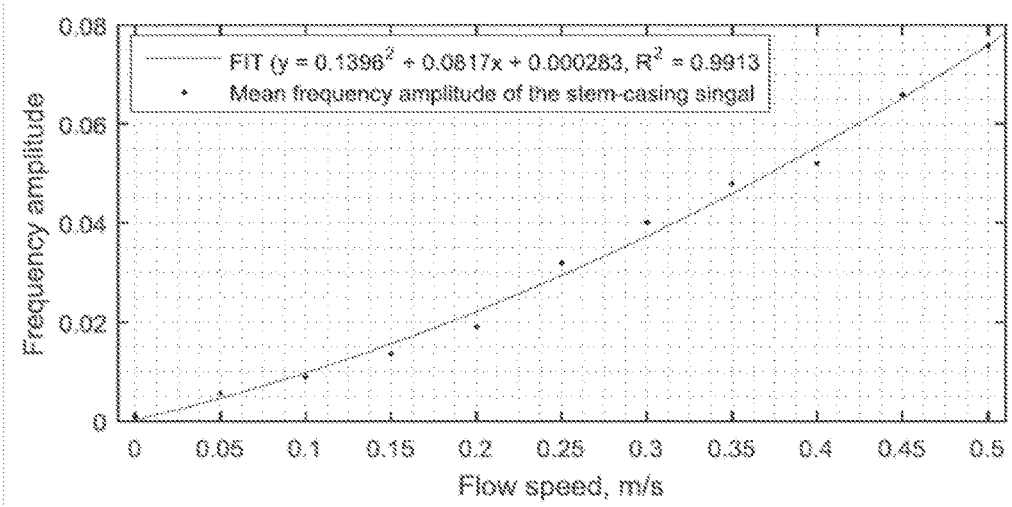
FIG. 8 illustrates the dependence between the mean values of the amplitude of the frequency spectrum of oscillation of the plastic rod (where the effect of signal caused by oscillation of the body has been eliminated) and the speed of fluid flow (0 to 0.5 m/s2) in the case of the embodiment of the device shown on FIG. 1.

FIGS. 1 to 4 include a detailed illustration of sensor device 1 of one embodiment of the invention for determining the parameters of fluid flow, which includes oblong, cylindrical element 2, which is fixed in one end to a flexible element, specifically flexible membrane 3 of the embodiment, which enables the cylindrical element to incline in the flow in the direction of the flow. With the membrane, the cylindrical element is mechanically connected to a vibration sensor, specifically the first accelerometer 4 (G sensor). Membrane 3 is fixed to body 5 through the first body wall 6 including a relevant aperture 7, and the edges of the membrane are pressed against the first body wall with clamp 8 inside the body 5. The second accelerometer 9 is fixed to the body of the base unit.

Results

As regards the embodiments illustrated on FIGS. 1 to 4, the oblong element was made of a rigid plastic rod with a circular cross section, with a diameter of 10 mm and length of 100 mm. The membrane was made of silicone (Elite Double 22, Zhermack SpA). In order to eliminate inclinations of the body caused by the installation and other reasons, the second accelerometer was installed to the body; the difference of readings of accelerometers which measure the inclinations of the rod and body was measured.

The accelerometers were connected to a 32-bit ARM microcontroller (ST Microelectronics) over a 400 kbps I2 C bus. Inclination towards x and y axes was calculated with a gravitation vector and arc tan function, assuming that the rod did not rotate around z-axis, and the effect of noise caused by the change in turbulence of the fluid was eliminated through the time-averaging of the output signal.

The sensor was tested in a flow tunnel with dimensions of 0.5 m×0.5 m×1.5 m, where a constant flow of fluid with calibrated speed was ensured. The sensor was installed at the bottom of the tunnel, in the middle. The experiments were performed with flow speed intervals of 0.05 m/s and a maximum speed 0.5 m/s. Each flow speed was kept stable and data were recorded in 30 s.

Test results are shown on FIGS. 7 to 10. The behaviour of a device with selected parameters (length of the oblong element, diameter, size of membrane, thickness, flexibility) will change at the speed of fluid flow of 0.25 m/s. Dependence of the inclination angle of the element a (see FIG. 2) on the root-mean-square values of the speed of fluid flow (whereby initial shifts are eliminated with the second accelerometer) is illustrated on FIG. 7. Square dependence applies (correlation coefficient R2=0.9987) at a speed up to 0.25 m/s; linear dependence (R2=0.9913) applies at a speed of 0.25 m/s to 0.5 m/s. The change is caused by transfer to turbulent flow. Turbulent flow causes oscillation which is characteristic to any flow speed in the system including an element and membrane, which is influenced mainly by fluid flow, buoyancy of the element and rigidity of the membrane.

Figure 10:
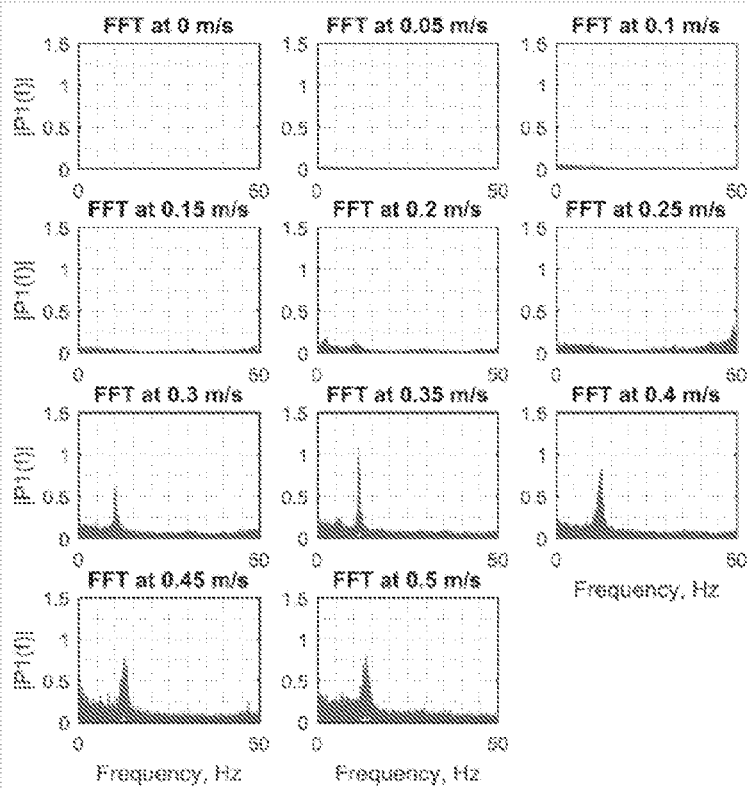
FIG. 10 illustrates the frequency spectrum of fast Fourier transform from the signal between the tilting angle of the plastic rod and body at flow speeds 0-0.5 m/s with 0.05 m/s interval. Sharp peaks on graphs form at turbulent fluid flow.

The spectral analysis of oscillation results with fast Fourier transform is illustrated on FIG. 10. Frequency peaks can be distinguished at a speed over 0.3 m/s. Average amplitude increases with the increase of flow speed, whereby square dependence applies (R2=0.9913).

Figure 9:
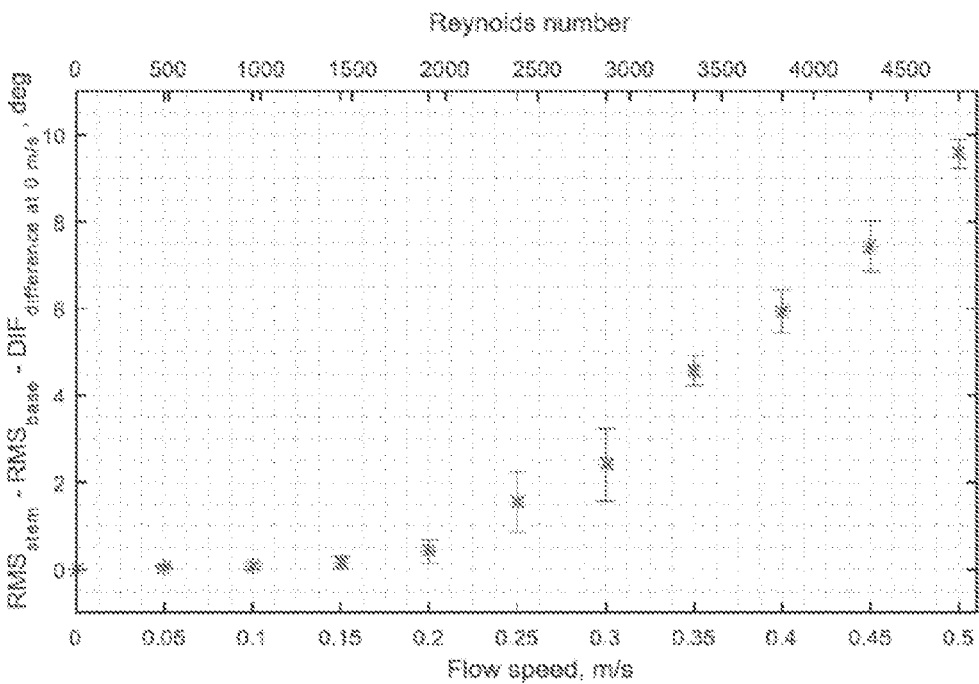
FIG. 9 illustrates the dependence of the root-mean-square values of the tilting angle of the plastic rod on the speed of fluid flow, together with relevant values of the Reynolds number, whereby the highest standard deviation can be seen upon transfer from laminar flow to turbulent flow.

Different behaviour of the device in the case of the two flow regimens can also be seen from standard deviations of oscillation, which are the highest upon transfer from laminar flow to turbulent flow (relevant Reynolds number over 2,000), see FIG. 9.

Flow speed of the fluid can be determined with the device in two ways. First, flow speed can be determined based on the inclination of the element, whereby the area of square or linear dependence is determined based on the existence of frequency peaks appearing in the spectral analysis of the oscillation spectrum. The second option is to use square dependence between the mean values of the amplitude of the frequency spectrum and flow speed. However, a combination of the described two methods may provide the best result.

Selection of parameters of the oscillation system formed of the oblong, cylindrical element and flexible link, including rigidity, diameter and length of the cylindrical element and dimensions and flexibility of the membrane, enables changing the behaviour of the oscillation system in the laminar as well as turbulent flow. Softer membrane enables the oblong element to tilt more in laminar flow, providing higher sensitivity. In addition, a system with a softer membrane is more sensitive for detection of transfer from laminar to turbulent flow.

Figure 11:
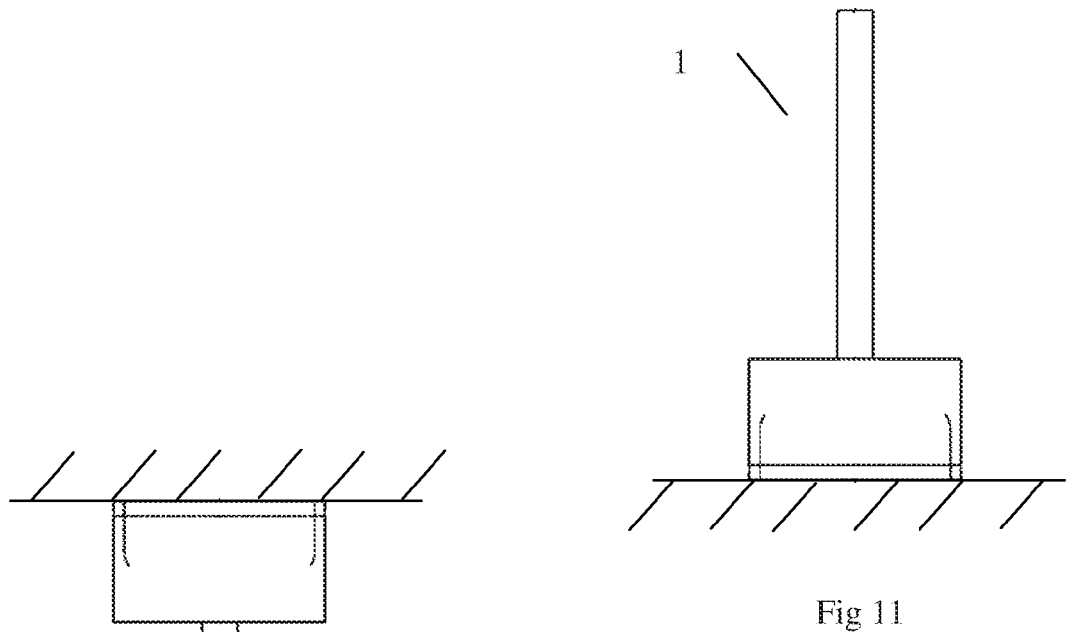
FIGS. 11 to 13 illustrate various installation cases of embodiments of the invention.
Figure 12:
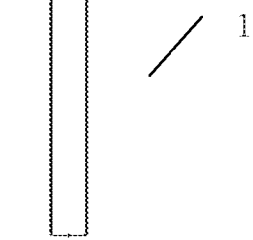
Figure 13:
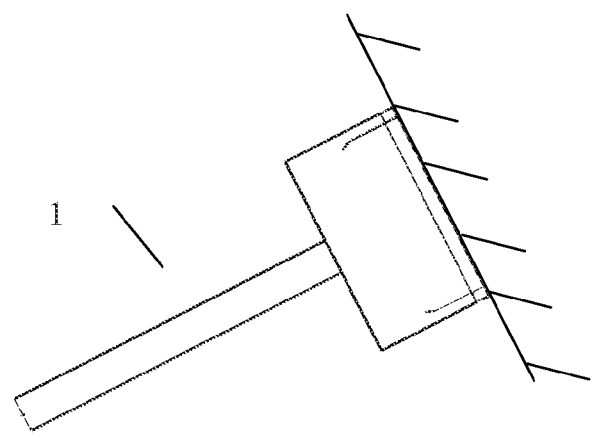

Upon installation of one embodiment of the invention, the oblong element may remain in different positions in relation to the gravitation vector, e.g. directed downward (FIG. 11), upward (FIG. 12) or inclined (FIG. 13). In order to take account of the inclination, the body of the device is equipped with a second accelerometer. The second accelerometer also enables eliminating possible errors caused by vibration of the installation base.

Figure 14:
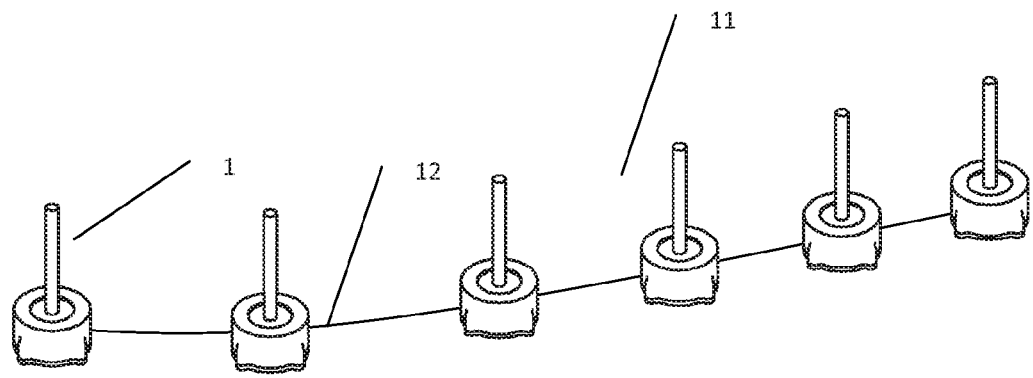
FIG. 14 illustrates a line formed of devices of the invention.
Figure 15:
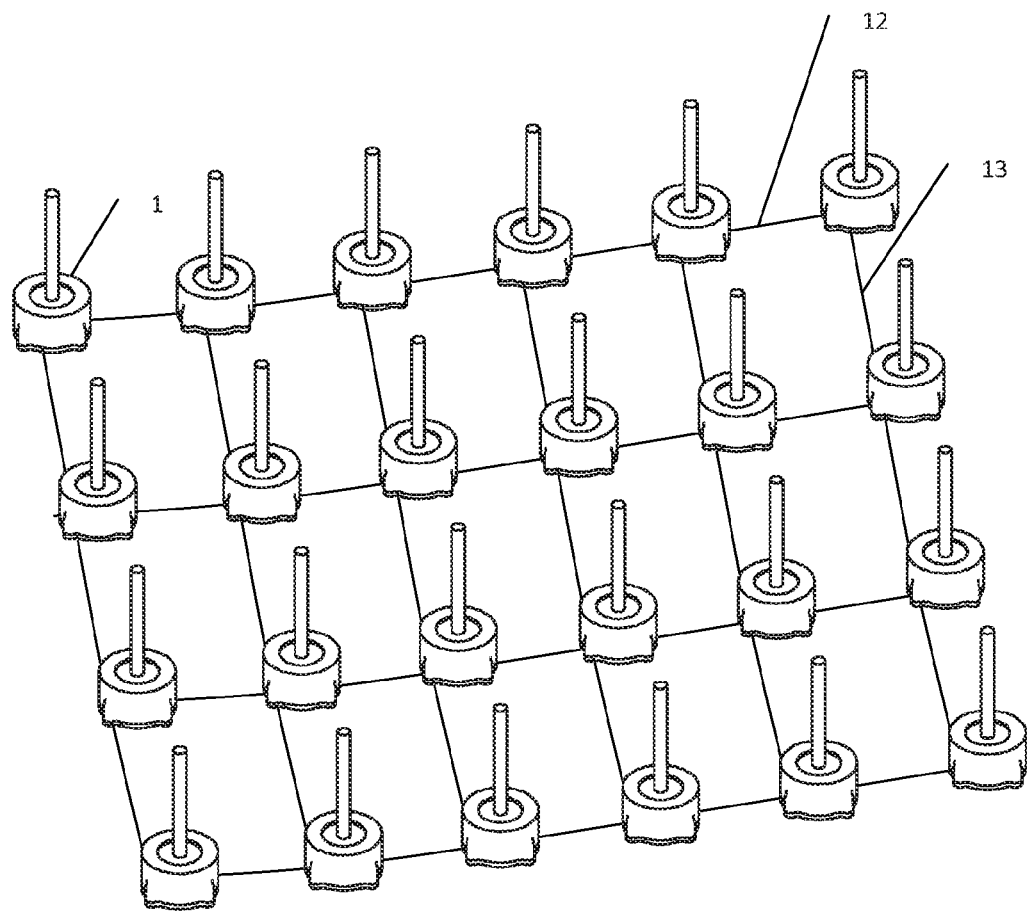
FIG. 15 illustrates a network formed of devices of the invention.

FIGS. 14 and 15 illustrate correspondingly the measuring line 11 and network 13, which include embodiments of the invention mutually electrically and mechanically connected with the connection 12 for arranging measurements in several points, enabling constructing a vector of flow parameters or a two or three-dimensional map. Upon installation, such grouped devices can be set to read and store data with specified intervals or based on any other regularity during a specified period. Embodiments are synchronised upon installation and removed after the expiration of a specified period for reading data.

These exemplary embodiments are intended only for illustrating the invention. Other variations and modifications of the invention, such as the use of flow blocking objects with different shape and different dimensions, and the use of different sensors known in the art, are self-evident for the specialists of relevant field without differing from the nature of the described invention.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A sensor device for determining fluid flow parameters, the sensor comprising:
   a base unit;
   an oblong element, having a flexible link in one end, said oblong element fixed mechanically to said base unit with said flexible link and extending into fluid, said oblong element mechanically connected to a vibration sensor; and
   a data acquisition module inside said base unit, said data acquisition module electrically connected to said vibration sensor, wherein said data acquisition module is adapted to determine a frequency response curve of oscillation in said oblong element due to liquid flow, and to determine flow parameters from the measured frequency response curve, wherein such flow parameters include flow speed, direction of flow, type of flow, and Reynolds number.

2. The sensor device as in claim 1, wherein said oblong element is a rigid rod.

3. The sensor device as in claim 2, wherein said rigid rod has ball shape tip.

4. The sensor device as in claim 1, wherein said vibration sensor is an accelerometer.

5. The sensor device as in claim 2, wherein said flexible link comprises a membrane, made of elastic material, said base unit having an aperture on one of its side and said membrane attached to said base unit at edges of said aperture.

6. The sensor device as in claim 2, wherein said flexible link is a spring or a ball joint.

7. The sensor device as in claim 1, wherein the sensor device comprises a second accelerometer attached to said base unit, said second accelerometer adapted for determining a tilt of said base unit, or an oscillation of said base unit.

8. A method for determining fluid flow parameters in a reservoir, fluid body or in a pipe, wherein said method comprises:
   introducing into said fluid flow a sensor device, said sensor comprising a base unit, an oblong element extending into said fluid flow for obstructing said fluid flow, said oblong element mechanically connected to base unit with a flexible link, and a first accelerometer mechanically connected to said an oblong element and a data acquisition module;
   determining by said data acquisition module a frequency spectrum of said oblong element; and
   calculating by said data acquisition module said fluid flow parameters from said frequency spectrum.

9. The method as in claim 8, wherein said flexible link comprises a membrane, made of elastic material, said base unit having an aperture on one of its side and said membrane attached to said base unit at edges of said aperture.

10. The method as in claim 8, wherein flexible link is a spring or a ball joint.

11. The method as in claim 8, wherein said fluid flow parameters include speed of the fluid flow, and the type of the fluid flow.

12. The method as in claim 11, wherein said speed of the fluid flow and said type of the fluid flow is determined based on the average value of the amplitude of said frequency spectrum in the region of resonance frequency of the system of the cylindrical object.

13. The method as in claim 11, comprising determining said speed of fluid flow and direction of said fluid flow from an angle between a gravitation vector and said cylindrical element, and determining said type of fluid flow on the average value of the amplitude of said frequency spectrum in the region of resonance frequency of the system of the cylindrical object.

14. The method as in claim 12, wherein said direction of fluid flow is determined through the difference of output signals of multidimensional accelerometers.

15. The method as in claim 8, wherein said sensor device is attached to a technical construction in said liquid body, with said oblong object directed into said fluid flow.

16. The method as in claim 8, wherein an initial inclination of said oblong object compared to gravitation vector is determined additional reference micromechanical sensor attached to said base unit with static positions not depending on the fluid flow.

17. The method as in claim 8, wherein vibration in an installation site of the oblong object is compensated with the information of other micromechanical sensors installed in the sensor device which are not influenced by the flow of fluid.

18. The method as in claim 8, comprising arranging several sensor devices into groups to measure the parameters of fluid flow in several space points and constructing a vector of the parameters of liquid flow, or a two or three-dimensional map.

19. The method as in claim 8, wherein data collected by said sensor device are processed on site by a microprocessor or by a computer.

20. The method as in claim 8, wherein data collected by said sensor device are transmitted for processing into a central computer or cloud service.

\* \* \* \* \*